United States Patent [19]

Hockmeyer

[11] Patent Number: 4,473,614

[45] Date of Patent: Sep. 25, 1984

[54] LIGHT-WEIGHT DURABLE FIRE-ENTRY FABRIC AND SUIT

[76] Inventor: Peter F. Hockmeyer, 30 Warwick La., Basking Ridge, N.J. 07920

[21] Appl. No.: 380,613

[22] Filed: May 21, 1982

[51] Int. Cl.$^3$ ............................................. B32B 7/00
[52] U.S. Cl. .................................. 428/248; 428/249; 428/251; 428/252; 428/443; 428/445; 428/920; 428/921
[58] Field of Search ............... 428/248, 249, 251, 252, 428/443, 445, 921, 920

[56]  References Cited
U.S. PATENT DOCUMENTS 4,113,907 9/1978 Haage .................................. 428/251

Primary Examiner—Marion McCamish
Attorney, Agent, or Firm—William T. Hough

[57]  ABSTRACT

In a preferred embodiment, a fire-entry suit includes a substantially one-piece suit having a hood attached at a rear neck-portion and having gloves of which forearm-portions thereof are attachable to forearm-portions of the suit-sleeves by Velcro-like fasteners, with a hood overlay-portion likewise being attachable to chest and shoulder portions of the suit by such fasteners; the shoe-receiving portion is continuous with the legs of the suit. A major novel aspect of the fire-entry suit is the composition of the suit-material, namely being eight layers of separate materials one on top of the other, including an outside water-repellant material coated on the outer-layer of asbestos fabric material, an eighth, inner fabric material of phenol polymer fibers, and a plurality of intermediate alternating layers including an inwardly second fabric material of asbestos and cotton, an inwardly third metalized metal coat fabric of organic fibers typically known as novoloid synthetic coated with aluminum at-least on an outer-most surface thereof, an inwardly fourth repeat of the fabric material of asbestos and cotton fibers, an inwardly fifth repeat of the metalized metal-coated fabric of the typically novoloid synthetic organic fibers, an inwardly sixth repeat of the fabric material of asbestos and cotton fibers, and an inwardly seventh repeat of the metalized metal-coated fabric of the typically novaloid synthetic organic fibers. Inside shoulder suspenders support the suit from about the seat or waist upwardly, and a front uprightly-extending zipper is covered by a flap-over portion of the suit-material which fastens in a flapped-over state by virtue of other Velcro-like fasteners.

3 Claims, 3 Drawing Figures

U.S. Patent    Sep. 25, 1984    4,473,614
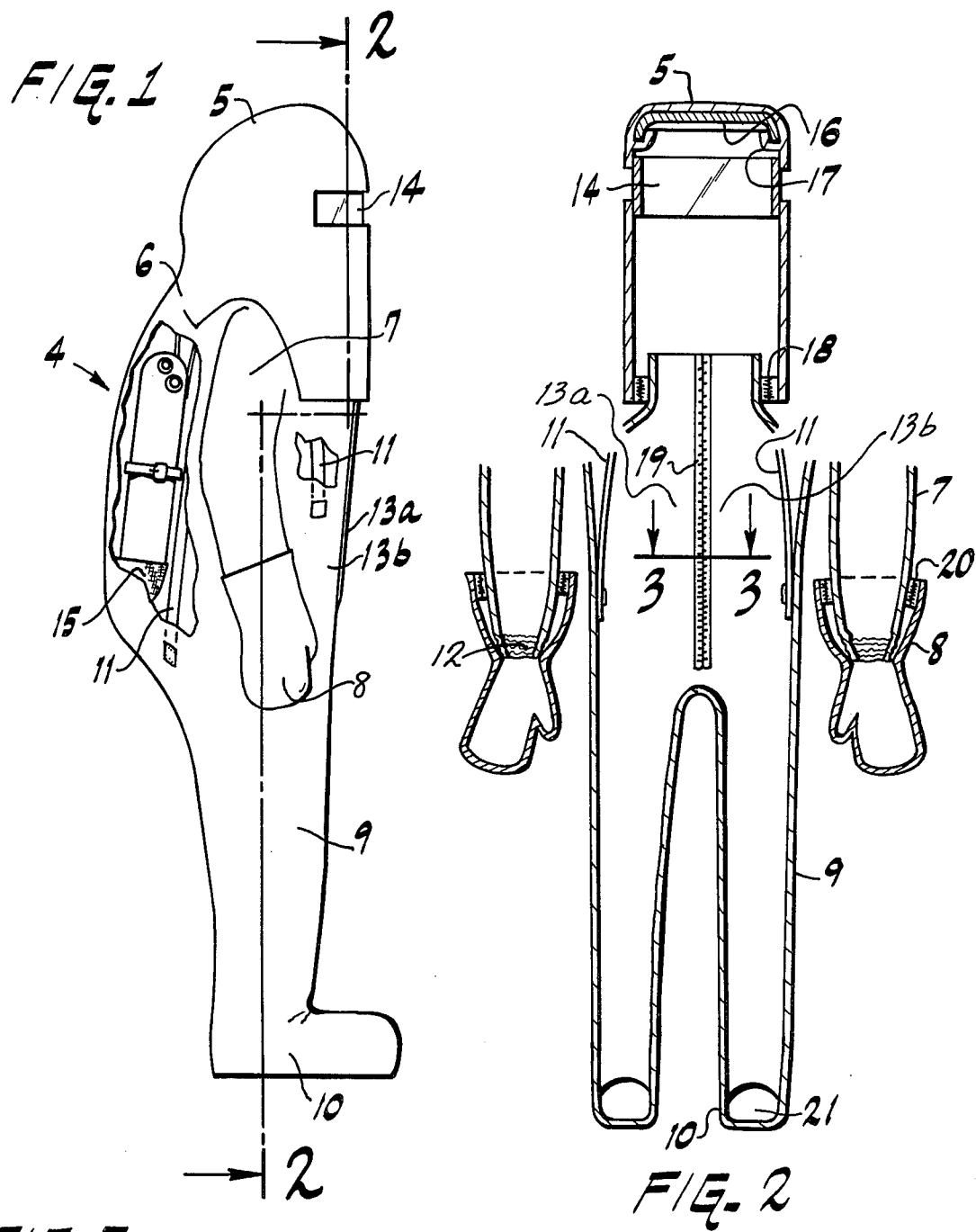
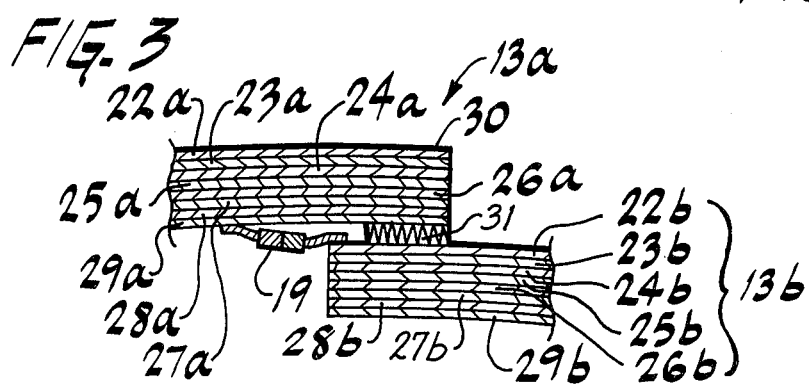

LIGHT-WEIGHT DURABLE FIRE-ENTRY FABRIC AND SUIT

This application is directed to a novel protective fire-entry suit.

BACKGROUND TO THE INVENTION

Prior to the present invention, even though there has been extensive need over the years for fire-entry suits for use in the fighting of oil fires, and for use in racing and in military vehicles, particularly in the testing of new aircraft and space vehicles, heretofore there has not been any adequate light-weight fire-entry suit having light-weight, thin suit-material and high flexibility characteristics in combination with long-term durability at very high temperatures. To understand the problems faced, it should be noted that there are lighter-weight "proximity suits"—a term of the trade, which proximity suits are intended for and utilizable solely for approaching high-temperature areas but not for exposure to flame(s) nor to radiant heat in excess of typically 1500 degrees Fahrenheit, nor to lower hot temperatures for extended periods of time. Even fire-entry suits presently commercially available embodying glass fabric, glass insulation, aluminized glass fabric and the like, is limited to fire entry and ambient temperatures up to 1500 degrees fahrenheit and has a weight of about 40 pounds(U.S.). The problems faced with a fire-entry suit include the preventing of heat transfer into the interior of the suit, as well as the prevention of deterioration of suit fabric too quickly when exposed to flame and/or radiation temperatures of more than 1500 degrees for one, two or more minutes continuously, and to continued contact of the person with the interior of the suit after the suited person's withdrawal from the area of heat or flame. The flame-entry suit as well as the proximity suit both have back-interior space for location of an air or oxygen-breathing apparatus worn normally and typically conventionally with such suits. Accordingly, the solution is not merely having a material resistant to fire or to heat—for example mere asbestos fiber being readily resistant to both heat and flame, and likewise glass fibers being resistant to flame and heat. The further problem is to achieve resistance to heat transfer in the absence of a bulky and/or heavy and/or cumbersome suit.

These problems become even more pronounced when it becomes necessary to wear normal clothing over such a suit, and when it is important for the wearer to appear as a normal suit-less person ingulfed in fire, as is the case in use of movie and television stunt men who must appear to be dressed in merely street-clothing during a burn-scene filming. There cannot be excessive bulk nor excessive weight to the suit, together with the necessity for a protection against both flame and high temperature heat, and the need for the actor to maintain a high level of manual dexterity by virtue of the limber nature of the fire-entry suit. Desirably such suit would have a weight substantially below and normally not exceeding forthy pounds, while also achieving the flexibility of a high degree and together with the achieving of a protection against both flame and high temperature heat well in excess of 1500 degrees Fahrenheit or about (in excess of) 1000 degrees Centigrade.

SUMMARY OF THE INVENTION

Accordingly, objects of the invention include the overcoming of one or more difficulties and disadvantages of prior fabric combinations and fire-entry suits of the nature and types described above.

Another object includes the obtaining of a fire-entry suit material having improved and higher-temperature resistance to both radiant heat and to flame.

Another object is to obtain a suit material utilizable in wet or moist environment as in the case of firemen or other situations where the fire-entry suit may be brought into contact with water either accidentally or intentionally, devoid of hazard of deterioration of the flame or temperature resistance under wet or damp conditions.

Another object is to obtain an improved fire-entry suit of the novel suit-material of this invention.

Another object is to obtain a fire-entry suit having a long life of high durability, retainable of resistance to flame and high temperatures well in excess of 1500 degrees in-so-far-as continued suitability to wear the same protectively in repeated flame and/or high-temperature exposures.

Another object is to obtain a substantially one-piece fire entry suit having characteristics of being susceptable for the wearer to alone himself put-on and take-off the suit.

Another object is to obtain a fire-entry suit having improved seals against flame and/or heat exposure of heat-transfer parts thereto.

Another object is to obtain a fire-entry suit having the hood permanently attached to or a part of the body-portion of the suit, preferably being susceptable to flip-backwardly when removing the hood.

Another object is to obtain a fire-entry suit adapted for quick suiting, and as well also adapted for quick-escape therefrom in the event of failure or excessive heating of interior layers or space or any part thereof.

Another object is to obtain a fire-entry suit having separate and quick-sealing glooves.

Another object is to obtain a fire-entry suit having a mechanism for temporary suspension of the suit when an uper-body portion thereof is dismounted from shoulders and arms.

Another object is to provide various of above-noted suits of this invention with skull protection against impact from falling objects or other percussion(s).

Other objects become apparent from the preceding and following disclosure.

One or more objects of the invention are obtained by the invention as typically illustrated in the accompanying drawings of the Figures, which embodiments are not intended to narrow the scope of the invention unduly, but are intended to merely improve understanding and preferred embodiments to be illustrated, the invention including broader scope of embodiments not illustrated herein.

Broadly the invention may be described as a fire-entry suit material characterized as a light-weight fire-entry suit material characterized as a light-weight fire-entry fabric that includes an outer material layer of asbestos, an inner-most material layer of synthetic organic fibers; therebetween intermediate paired layers of (1) asbestos and cotton layer and (2) metalized fabric of the synthetic organic fibers (such as typically novoloid) in the paired layers; preferably the intermediate outer layer is of asbestos and cotton, and and the intermediate inner layer of synthetic organic fabric (such as typically the novoloid) includes the metal coating. Preferably the metal is aluminum. In any event, the metalized layer is of a heat reflective nature. The synthetic organic fibers are preferably cross-linked phenol polymers. Protective nature of the novel suit improves with an increase of the number of the paired layers, in a preferred embodiment the number of paired layers being three, giving a total number of eight layers, resistant to more than 2000 degrees Fahrenheit.

Also preferred is a coating included as a water-repellant coating to the outer-most suit-layer; any conventional water-repellant material may be utilized which itself is fire-resistant and/or high-temperature resistant, or which has such characteristics when a fire-retardent material included intermixed therewith.

In another more preferred embodiment, the asbestos outer-most layer is 100 percent(%) asbestos fibers typically Novatex(TM) fibers; and the various layers of asbestos and cotton above-noted are typically a fabric weaved or otherwise constructed by fire-retardant threads and/or by adhesives holding-together a blend of fibers of asbestos and cotton; and the aluminized (or otherwise metalized) fabric is above-noted cross-linked phenol polymer fibers coated with aluminum, such as aluminized Kynol. Such blend of fibers as noted above may be blended, woven, or otherwise combined and held-together by any desired or conventional technique and/or design.

It is noted, that while the inventor is not bound by theory, the cotton content apparently serves to insulate further-interior parts and spaces from heat conduction or other heat-transfer therethrough; this was discovered, to arrive at the inventor's above-described invention by way of repeated experiments over a long period of time. The above-noted 2000 degree-resistant is very signicant and unexpected, and protects the wearer thereof for periods up to two or three minutes or more at that elevated temperature and/or in direct contact with flame; also the suit, unexpectedly, is repeatedly utilizable at such unusually high temperatures and such extended period of time as noted-above, for extended periods of durability. Longer periods of exposure are possible at any one time as the temperature is less elevated, and naturally the life of the suit will be likewise greater under such conditions.

While Novatex has been above-mentioned as one brand of 100% woven asbestos fibers, this invention is not limited to any particular brand thereof. Likewise, the above-noted cross-linked phenol polymer fibers are typically known in the chemical fiber industry as novolac fibers, and of the aluminum-coated novolac polymers the above-noted Kynol fibers are merely one particular brand of such aluminum-coated novolac fibers, and this invention is not limited to any such particular brand thereof. Also, the invention is not limited to a coating of such novolac fibers with solely aluminum, but to the contrary other metals as coatings serve substantially the same function although aluminum coating is probably a more practical and available one.

The above-discussed outside layer is substantially 100% asbestos fibers in a preferred woven plain weave and the fibers have a weight of about 1.35 pounds per sq. yd. in that preferred weave, the asbestos fivers having a gauge of about 0.060, and a count of about 20×9, and a warp tensile strength of about 225 pounds and a fill tensil strength of about 110 pounds, and this particular preferred embodiment includes an outer coating on that outer layer, and also the outer coating consists of a water-retardant silicone resin—conventionally known in the prior art.

It should be noted, for example, that the company Raybestos Industrial Products that sells the 100% asbestos under its particular tradename Novatex(above-noted) as, for example, alternate cloths known as styles 9H140N and 15H100N and 15P095N, there are also other styles in which the cloth includes a blend of aramid fibers well known conventionally in the prior art and trade—as its styles 36P064N and 36P064N-Aluminized, the latter one of which the fabric is coated with aluminum metal as a metal reflective surface. In like manner, Du Pont de Nemours company has its brand name of Nomex for the aramid fibers of the type of the Raybestos Industrial Products, such aramid fibers having been around many years—as is evidenced by the 1973 patent U.S. Pat. No. 3,763,497, which discusses both the aramid fibers brand Nomex, and as well the aluminum-coated cross-linked phenol fibers of the brand known as Kylol discussed-above.

Accordingly, for the intermediate paired layers discussed-above, the inner layer thereof preferably includes a blend of the asbestos fibers with the aramid fibers, of any of conventional and optionally alternately available brands as already-discussed above in preceding paragraphs. Also it would be within the scope of the invention to include other optional fibers such as glass fibers equally well known in the trade.

Thus, this application is not limited to any particular brand of these asbestos fibers, cross-linked phenol polymer fibers (known in the trade as novolac fibers), and metal-coated forms thereof, and aramid fibers.

It may be noted that, as has also been common knowledge in the prior art of the fiber chemical industry, the aramid fibers typically have about 85%(percent) or more of the amide linkages being attached to two aromatic rings.

In a further embodiment, the fire-entry suit is provided in a substantially one-piece unit; the hood and gloves may be separate, but preferably the hood at least is connected or otherwise mounted permanently most-preferably at the back of the neck portion to the body-portion of the fire-entry suit, enabling the hood to be carried in the flipped-back position. Also preferably the gloves are separate and have extensions to at-least partially extend upwardly over the forearms. More preferably each glove has, in combination with a sleeve of the suit, a Velcro(trademark)-like attaching mechanism as a part thereof, effective to seal heat from the hands vicinity. There also preferably is an elastic base at the bottom of each sleeve, enabling easy insertion of the hand and suited-forearm into the glove.

The fire-entry suit preferably has a zipper unit for speedy suiting-up and subsequent speedy de-suiting normally or in event of emergencies or of suit-failure or fatigue or the like. The zipper as well as the insulation against heat-transfer through the zipper, are protected and provided-for by an overlap of the suit-material, also preferably sealed-down by a Velcro-like mechanism.

There is provided a sleeve-support in the hood within which there is mounted a percussion cap providing protection to the head and skull against injury from falling objects or the like that may possibly strike the head in fire or other hazardous areas. There is also provided a supporting sleeve or base for offering bottom-support to an air or oxygen tank or unit carried on the back of the person wearing the fire-entry suit.

The invention may be better understood by making reference to the following Figures.

THE FIGURES

FIG. 1 illustrates a preferred embodiment of the fire-entry suit of the present invention, in a side view thereof.

FIG. 2 illustrates a view of the embodiment of FIG. 1, as taken along line 2—2 of FIG. 1, showing cross-sections at two different points.

FIG. 3 illustrates in enlargement and in diagrammatic view, the zipper and overlapped suit-portions as taken along line 3—3 of FIG. 2, in a cross-sectional view thereof.

DETAILED DESCRIPTION

FIGS. 1 through 3 represent a single embodiment, disclosing differing views and illustrating often different features of the invention.

The overall entry suit as a whole is designated as suit 4 of which there is hood 5, inter-connecting neck portion 6, arms 7, gloves 8, legs 9, foot-portions 10 having foot-space(shoe space) 21. A lower-half of the suit is supported by shoulder suspenders 11. The sleeve-end opening-portions 12 are of elastic fabric so as to facilitate holding-down the sleeves and to facilitate putting-on the gloves. The hood has an eye-level opening sealed by transparent (or translucent) element 14 mounted on the hood material by any appropriate or conventional mechanism. An inner back portion of the suit includes a mounted-pocket positioned to support a lower end of an air tank, illustrated as pocket 15; the air or oxygen tank and apparatus thereof may optionally also include additional supporting mechanism as desired or conventional for carrying by a person on his back. Within an upper portion of the hood 5 is flange or pocket-like material 17 constructed and positoned to support concussion plate (percussion cap) 16. At a lower edge of the hood material, and on the opposite-position on the shoulder and-/or neck portions of the suit, is located Velcro-type attaching element 18. Zipper 19 is best viewed in FIG. 2, but can be seen also in FIG. 3 with one portion mounted-on the left-front material portion 13a and with a remaining zipper portion mounted-on the right-front material portion 13b. The upper-flaring wrist or fore-arm-portions of the gloves 8 and the opposite-portions of the arms(sleeves) 7 have Velcro-like attaching-material elements 20 mounted thereon for sealing-down and thereby closing the open portions of the gloves when worn as a part of the suit. It is to be understood, however, that the gloves may be continuous with and integral part of the suit, not necessarily being separate.

As compared to prior proximity suits, and fire-entry suits respectively, each of which typically weight forty (40) pounds(U.S.) or more, the present suit of this invention or a comparable size weighs typically thirty-two pounds or less, together with the present suit having superior resistance to fire(flame), heat, and having superior durability, and other advantages previously discussed above. For less stringent or severe conditions, the suit of the present invention may be even lighter by reducing the number of layers of fabric as previously described, and as herein after described.

FIG. 3 illustrates a front-of-suit cross-section through the materials-portions 13a and 13b noted-above, and the flap-over portion of material-portion 13a which has mounted thereon the Velcro-like elements are also mounted on the oppositely-located portion or position on the material portion 13b, for sealing-away the heat and flame from the zipper 19, and for the essential ease and speed of getting into and out-of the suit within minimal time.

The entire suit has a protective coating 30 thereon of a conventional or otherwise desirable water-repellant material, such as silicone resin, for example. Such is disclosed by U.S. Pat. No. 2,709,677, col. 3, line 43.

In FIG. 3, the inventive and critical arrangement and order of occurance of critical layers making-up the suit-material are set-forth, as to the composition of material portion 13b, and 13a.

Accordingly, outermost layers 22a and 22b as illustrated in FIG. 3, are each coated with the water-repellant coating 30; the second layer (in a direction moving from the outer-most layer) is layers as shown as 23a and 23b, followed by layers 24a and 24b, followed by layers 25a and 25b, followed by layers 26a and 26b; as seen in FIG. 3, layers designated "a" and "b" for a particular number, are of identical composition and nature. Accordingly, 22 (inclusive of 22a and 22b) is woven fabric of 100% asbestos (such as typically Novatex fabric). Thereafter, as "paired groupings", there are paired-layers 23 and 24, and then 25 and 26, and then 27 and 28, and thereafter there is the inner-most layer 29. Each of layers 23, 25 and 27 is a blend of asbestos and cotton. Each of layers 24, 26 and 28 is a fabric of aluminum-coated blend of cross-linked phenol polymer fibers (such as Kynol) and aramid fibers (such as Nomex). The inner-most layer 29 is a layer of the synthetic organic fibers.

A typical Novatex fabric is the Novatex Style 9P135N cloth, Grade AAAA, Weave—plain, Treatment—sealsafe, Weight—1.35 lbs. per sq. yd., Gauge 0.060, Count 20×9, Tensil strength: warp—225 lbs., fill—110 lbs..

While aluminum or other metal coatings has been discussed-above, it is noted that the use of such aluminum coating is disclosed in U.S. Pat. No. 3,849,802 which discloses heat-reflective aluminum or gold coating a material, such typical coated material being stated to be Du Pont trademarked material Tyvek which is made from 100 percent high density polyethylene fibers.

As noted-above, the fabrics and layers thereof and different parts of the suit of this invention, may be held together by any one or more of threads and/or adhesives or the like. Included also are conventional resin(s) and/or above-noted adhesives, threads, or the like and may be of any desired and/or conventional weaving or by knitting or the like, such not being the essence of the invention.

While additional options add to weight of the inventive suit, and optionals may have some cummulative or merely speculative benefits, it is within the scope of the invention to include other materials and/or layers, and to make other variations and/or modifications and/or substitution of equivalents as would be obvious to a person of ordinary skill.

I claim:

1. A light-weight fire-entry fabric comprising in combination: an outer layer, intermediate layers, and an inner layer; said outer layer being material consisting essentially of asbestos; said intermediate layers consisting essentially of a plurality of substantially alternating layers of material, comprising substantially an outside layer and an inner-side layer, one of said outside layer and inner-side layer consisting essentially of asbestos and cotton, and the remaining other of said outside layer and said inner-side layer consisting essentially of an outerface coating of reflective metal on sheet material of synthetic organic fibers; said inner layer consisting essentially of the synthetic organic fibers.

2. A light-weight fire-entry fabric of claim 1, in which said inner-side layer further consists essentially of aramid fibers in a blend with said synthetic organic fibers, said synthetic organic fibers being crosslinked phenol polymer.

3. A light-weight fire-entry fabric of claim 2, in which said outer layer and said alternating layers and said inner layer are held-together by sewn threads, in which said reflective metal matter consists of aluminum metal coating, in which said sheet material consists essentially of aramid fibers blended with the phenol polymer fibers, coated with said aluminum metal coating, in which said outside layer is substantially 100% asbestos woven as a plain weave and having a weight of about 1.35 lbs. per sq. yd., and a guage of about 0.060, and a count of about 20×9, and a warp tensile strength of about 225 lbs. and a fill tensil strength of about 110 lbs., and including an outer coating on said outer layer and in which said outer coating consists of a water-retardant silicone resin, said synthetic organic fibers being novoloid fibers.

* * * * *